United States Patent
Berliner et al.

(10) Patent No.: US 6,631,126 B1
(45) Date of Patent: Oct. 7, 2003

(54) WIRELESS COMMUNICATIONS USING CIRCUIT-ORIENTED AND PACKET-ORIENTED FRAME SELECTION/DISTRIBUTION FUNCTIONS

(75) Inventors: Edward F. Berliner, Randolph, NJ (US); Harvey Rubin, Morris Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/330,509

(22) Filed: Jun. 11, 1999

(51) Int. Cl.$^7$ ............................................. H04B 7/216
(52) U.S. Cl. ...................................... 370/342; 370/332
(58) Field of Search ................................ 370/320, 329, 370/331, 332, 335, 342, 442

(56) References Cited

U.S. PATENT DOCUMENTS

| | | | |
|---|---|---|---|
| 5,268,933 A | 12/1993 | Nimrod | |
| 5,305,308 A | 4/1994 | English et al. | |
| 5,673,031 A | 9/1997 | Meier | |
| 5,673,259 A | * 9/1997 | Quick, Jr. .................... | 370/342 |
| 5,799,010 A | 8/1998 | Lomp et al. | |
| 5,896,411 A | 4/1999 | Ali et al. ..................... | 375/200 |
| 5,920,817 A | 7/1999 | Umeda et al. .............. | 370/331 |
| 6,154,659 A | 11/2000 | Jalali et al. .................. | 455/522 |
| 6,163,707 A | 12/2000 | Miller ......................... | 455/522 |
| 6,167,270 A | * 12/2000 | Rezaiifar et al. ........... | 370/342 |
| 6,216,019 B1 | 4/2001 | Gibbons et al. ............ | 455/574 |
| 6,389,039 B1 | 5/2002 | Katinakis et al. ........... | 370/329 |
| 6,434,367 B1 | 8/2002 | Kumar et al. ............... | 370/331 |
| 2002/0067706 A1 | 6/2002 | Bautz et al. ................. | 370/331 |

FOREIGN PATENT DOCUMENTS

| | | |
|---|---|---|
| EP | 0 777 396 A | 6/1997 |
| EP | 0 845 877 A2 | 6/1998 |
| EP | 0877512 A2 * | 11/1998 |
| EP | 0 884 918 A | 12/1998 |
| EP | 0 891 114 A | 1/1999 |
| WO | WO 98 42108 A | 9/1998 |
| WO | WO 98 47302 A | 10/1998 |
| WO | WO 99/09660 | 2/1999 |
| WO | WO 99 09660 A | 2/1999 |

* cited by examiner

Primary Examiner—Nay Maung

(57) ABSTRACT

In a wireless communications system having a centralized interworking function (IWF) and geographically distributed base stations, a packet-oriented frame selection/distribution (FSD) function forwards forward-link user data intended for a particular mobile unit directly to a primary base station, which determines whether to transmit the forward user data to the mobile unit using a fundamental channel or a supplemental channel. If the data is to be transmitted using a fundamental channel, when the base station is operating in soft handoff, the forward user data is transmitted from the primary base station back to a circuit-oriented FSD function for forwarding to all of the base stations currently participating in the soft handoff, so that all of the base stations can transmit the forward-link user data to the mobile unit at the same time. If the data is to be transmitted using a supplemental channel, then the primary base station is able to assign a supplemental channel and transmit the forward user data to the mobile unit using the supplemental channel in simplex mode, independent of whether or not the mobile unit is otherwise operating in soft handoff. In this way, forward-link data transmissions can be performed without first having to coordinate either the timing or the data rate with any other base stations or with the FSD function. As such, the reactivation time needed to resume active forward-link data transmissions using a supplemental channel from the control hold state is less than the corresponding reactivation time under the prior art, which does require coordination of timing and data rate between all base stations in soft handoff.

30 Claims, 4 Drawing Sheets

BACK HAUL
REVERSE PACKET FORMAT

BACK HAUL
FORWARD PACKET FORMAT

WIRELESS COMMUNICATIONS USING CIRCUIT-ORIENTED AND PACKET-ORIENTED FRAME SELECTION/DISTRIBUTION FUNCTIONS

CROSS-REFERENCE TO RELATED APPLICATIONS

This application is one of a set of U.S. patent applications consisting of Ser. No. 09/330,888, Ser. No. 09/330,582, Ser. No. 09/332,274, Ser. No. 09/330,509 all of which were filed on the same date and the teachings of all of which are incorporated herein by reference.

BACKGROUND OF THE INVENTION

1. Field of the Invention

The present invention relates to telecommunications, and, in particular, to wireless communications systems conforming to a code-division, multiple-access (CDMA) standard, such as the cdma2000 standard of the IS-95 family of CDMA wireless standards.

2. Description of the Related Art

FIG. 1 shows a block diagram of a conventional CDMA wireless communications system 100. Communications system 100 is assumed to conform to the cdma2000 standard in the IS-95 family of CDMA wireless standards, although the present invention is not necessarily so limited. Communications system 100 comprises an interworking function (IWF) 102 connected to a radio link protocol (RLP) function 104, which is in turn connected to a frame selection/distribution (FSD) function 106, which is in turn connected to one or more base stations 110 via back haul facilities 108 (e.g., T1 lines). Depending on the specific implementation, IWF function 102, RLP function 104, and FSD function 106 may be, but need not be, physically separate functions.

Each base station 110 is capable of simultaneously supporting wireless communications with one or more mobile units 112. FSD function 106 performs a forward-link frame distribution function in which frames of data corresponding to user messages are distributed to the various base stations. In addition, FSD function 106 performs a reverse-link frame selection function in which frames of data received from the various base stations are processed for forwarding on to RLP function 104. In the forward-link direction, RLP function 104 segments user messages received from IWF function 102 into frames of data for distribution by FSD function 106. In the reverse-link direction, RLP function 104 reassembles packets of data received from FSD function 106 into user messages for forwarding on to IWF function 102. IWF function 102 implements a high-level point-to-point protocol (PPP) to perform certain centralized functions for communications system 100 to coordinate and control operations at the various base stations 110. IWF function 102 also functions as the interface between communications system 100 and other communications systems (not shown) to provide a full range of telecommunications services to the mobile units, including voice communications with a remote end unit and/or data communications with a computer server or other nodes of a computer network.

As used in this specification, the term "mobile unit" as well as its synonyms "mobile user," "mobile," and "user," will all be understood to refer to any end node communicating via wireless transmissions with one or more base stations of a wireless communications system, whether that end node is actually mobile or stationary. Also, as used in this specification, the term "base station" is synonymous with the terms "call leg" (or "leg" for short) and "cell site" (or "cell" for short).

The cdma2000 standard supports different modes of data communications. For relatively low rates of data messaging, a fundamental channel (FCH) can handle both signaling and data messaging. Signaling refers to the communications between a mobile and a base station that are used by the mobile and the base station to control the communications links between them, while messaging refers to the information passed through the base station to and from the end nodes of those communications, where the mobile is one of those end nodes. For high-rate data messaging, a supplemental channel (SCH) can be used for data messaging, while the fundamental channel handles the signaling between the mobile and the base station. Alternatively, when an SCH is used for data messaging, the signaling between the mobile and the base station can be handled by a special communications channel called a dedicated control channel (DCCH), which requires less power to transmit than an FCH, which is designed to handle low-rate data messaging in addition to signaling.

FIG. 2 shows a functional block diagram of a portion of communications system 100 of FIG. 1 for a mobile unit 112 operating in soft handoff with three base stations 110. Soft handoff refers to a situation in which a mobile unit is simultaneously communicating with two or more base stations, each of which is referred to as a call leg of those communications. Frame selection/distribution function 106 supports the soft handoff communications between mobile unit 112 and the three base stations 110.

During normal voice communications, mobile 112 transmits voice messages using a reverse-link fundamental channel. Each of the three base stations 110 in soft handoff with mobile 112 receives the reverse-link FCH, accumulates voice messages into reverse-link packets, and transmits the reverse-link packets over back haul 108 to FSD function 106. FSD function 106 receives the reverse-link packets from all three base stations, identifies sets of corresponding reverse-link packets (one reverse-link packet from each base station corresponding to the same voice messages received from the mobile), and selects one reverse-link packet from each set of corresponding reverse-link packets to transmit to the rest of the wireless system for eventual transmission to the remote end of the call (e.g., a connection with a regular PSTN user or possibly another mobile unit in communications system 100).

At the same time, FSD function 106 receives forward-link packets containing voice messages from the remote end of the call intended for mobile unit 112. FSD function 106 distributes copies of each forward-link packet to all of the base stations currently in soft handoff with the mobile. Each base station transmits the forward-link packets to mobile unit 112 using a different forward-link fundamental channel. Mobile unit 112 receives all three forward-link FCHs and combines corresponding voice messages from all three forward-link FCHs to generate the audio for the person using mobile unit 112.

The timing of the distribution of the copies of the forward-link packets from FSD function 106 to the three base stations is critical, because mobile unit 112 needs to receive each set of corresponding voice messages from all three forward-link signals within a relatively short period of time in order to be able to combine all of the corresponding voice messages together. Similarly, FSD function 106 needs to receive all of the corresponding reverse-link packets from the different base stations within a relatively short period of time in order to coordinate the selection of packets for further processing. In order to satisfy these forward-link and reverse-link timing requirements, whenever a new call leg is added at a base station (i.e., whenever a new base station begins communications with a particular mobile unit in soft handoff), special synchronization procedures are performed between the base station and FSD function 106, e.g., in order to ensure proper synchronization of that base station's forward-link transmissions with the forward-link transmissions from the other base stations currently participating in soft handoff with the mobile. These synchronization procedures involve specific communications back and forth between the base station and the FSD function over the back haul.

Although a fundamental channel can support some modest amount of data messaging in addition to voice messaging, the cdma2000 standard also supports high-speed data messaging via supplemental channels. According to the cdma2000 standard, since data messaging is typically bursty (i.e., intermittent), as opposed to the continuousness of voice messaging, supplemental channels are established and maintained only for the duration of each data burst. During a burst of data messaging via an assigned SCH, the mobile unit is said to be in an active state. Between bursts of data messaging when no SCH is currently assigned, but when an FCH (or DCCH) is assigned, the mobile unit is said to be in the control hold state.

Analogous to the use of a fundamental channel for voice and/or low-speed data messaging, high-speed reverse-link data messages are transmitted by mobile unit 112 using a reverse-link supplemental channel. Each base station currently operating in soft handoff with the mobile unit receives the reverse-link SCH and generates reverse-link packets of data messages for transmission to FSD function 106 via the back haul. FSD function 106 receives the reverse-link packets from all of the base stations and selects appropriate reverse-link packets for transmission to the remote end of the call (which, in the case of data messaging, may be a computer server).

Similarly, FSD function 106 receives forward-link packets of data messages intended for mobile unit 112 and coordinates the distribution of those forward-link packets via the back haul to the appropriate base stations for coordinated transmission to the mobile via assigned forward-link supplemental channels. In addition to the synchronization processing between each base station and FSD function 106 required to meet the timing requirements for receiving messages at the mobile, in data communications, the base stations need to coordinate their operations to ensure that they all transmit their forward-link SCHs to the mobile at the same data rate. This requires the base stations to communicate with one another via the back haul whenever a new burst of forward-link data is to be transmitted to the mobile unit requiring new SCHs to be assigned.

The time that it takes to change the status of a mobile unit from the control hold state to the active state is called the reactivation time. In prior-art IS-95 CDMA systems, the reactivation time includes the time required to assign a new channel to the mobile and the time required to synchronize each base station with the frame selection/distribution function. When the new channel is a supplemental channel to be used for data transmission to a mobile unit in soft handoff, the reactivation time also includes the time required for the different base stations to coordinate their forward-link transmission data rates. In general, the longer the reactivation time, the lower the data throughput of the wireless system. As such, it is desired to keep reactivation time as low as practicable.

SUMMARY OF THE INVENTION

The present invention is directed to a back haul architecture that effectively reduces the reactivation times for forward-link data transmissions over CDMA wireless communications systems. In particular, according to the present invention, forward-link data messages can be transmitted to a mobile unit using a forward-link supplemental channel operating in simplex mode (i.e., forward-link transmissions from a single base station) independent of whether or not the mobile unit is simultaneously operating in soft handoff to receive other forward-link transmissions via fundamental channels (or dedicated control channels) and independent of whether multiple base stations are simultaneously operating in soft handoff to receive any reverse-link communications from the mobile via a fundamental channel, a dedicated control channel, and/or a supplemental channel.

According to the present invention, in addition to a conventional circuit-oriented frame selection/distribution (FSD) function, a packet-oriented FSD function is implemented to handle the data messages being transmitted to and from the mobile unit. The packet-oriented FSD function transmits forward-link data messages directly to a primary base station, without first coordinating with the primary base station regarding time, duration, or rate of transmission over the air interface. The primary base station then decides whether to transmit the forward user data to the mobile unit using a supplemental channel or a fundamental channel.

If there is not a lot of forward user data to be transmitted, the primary base station can decide to transmit the forward-link data messages to the mobile unit using a fundamental channel. In that case, when the mobile is in soft handoff, the forward-link data needs to be provided to the one or more other (secondary) base stations, so that all of the call legs can transmit the data to the mobile unit at the same time. The present invention provides back haul reverse and forward packet formats to support the transmission of forward user data from the primary base station to the secondary base stations via the circuit-oriented FSD function.

Otherwise, the primary base station can decide to transmit the forward-link data messages to the mobile unit using a supplemental channel. In that case, whether or not the mobile unit is otherwise operating in soft handoff (e.g., via a fundamental channel), the primary base station assigns a supplemental channel and transmits the forward user data to the mobile unit using that supplemental channel in simplex mode. Because the forward-link supplemental channel is operated only in simplex mode, there is no need to coordinate either the timing or the data rate of forward-link data transmissions with any other base stations, and no such coordination needs to be performed in order to receive the data from the FSD function. As such, the reactivation time needed to resume active forward-link data transmissions using a supplemental channel from the control hold state is less than the corresponding reactivation time under the prior art, which does require coordination of timing and data rate between all base stations in soft handoff.

In one embodiment, the present invention is a wireless communications method, comprising the steps of (a) receiving forward-link data at a frame selection/distribution (FSD) function of a wireless communications system; (b) transmitting the forward-link data from the FSD function to a primary base station of the wireless communications system without first coordinating between the FSD function and the primary base station regarding transmission of the forward-link data from the primary base station over an air interface; and (c) determining at the primary base station whether to transmit the forward-link data over the air interface using a fundamental channel or a supplemental channel.

In another embodiment, the present invention is a wireless communications system, comprising an FSD function configured to (a) receive forward-link data; and (b) transmit the forward-link data to a primary base station of the wireless communications system without first coordinating between the FSD function and the primary base station regarding transmission of the forward-link data from the primary base station over an air interface.

In another embodiment, the present invention is a wireless communications system, comprising a primary base station configured to (a) receive forward-link data; and (b) determine whether to transmit the forward-link data over an air interface using a fundamental channel or a supplemental channel.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention addresses the problem of reactivation delay by providing a technique for reducing reactivation time without requiring any changes to the most recent IS-95 standards for CDMA wireless communications.

As described previously in the context of FIG. 2, in conventional CDMA wireless communications systems, a mobile user can be in communication simultaneously with more than one cell site (i.e., base station). Each such base station is called a soft handoff call leg for the user call. During soft handoff, each call leg receives the mobile's reverse-link transmissions at nearly the same time instant and passes the received information frame via the back haul to a frame selection/distribution (FSD) function, which receives the corresponding user information frames from the different call legs and selects the frame with the best quality. The base stations insert received-frame quality information into the packets they send on the back haul, so the FSD function can operate properly. Frames that are not selected are dropped, while the selected frame is processed further and is passed to the other end of the call connection. This technique allows CDMA systems to use geographically diverse antennas (i.e., those attached to the different call legs) to receive the user wireless transmissions, and, hence, to achieve low error rates while decreasing the power the user would otherwise need to provide in transmitting the wireless CDMA signals.

When information arrives from the other end of the call, the FSD function provides a distribution function, by sending each forward-link frame onto the back haul interfaces of each call leg. When the call legs receive the forward frames, they transmit the same information frame over the air to the mobile user at precisely the same time. The FSD function inserts information into the forward frames to enable the base stations to coordinate their air interface transmissions.

Because of the synchronism required for both the forward-link and reverse-link frames, the FSD function operates with the base stations in a circuit-oriented mode designed for continuous signal processing. Special call setup, call clearing, and frame synchronization procedures are associated with this functionality.

In the scenario described above and represented in FIG. 2, for a given call, a single traffic channel exists at each call leg to effect communications with the mobile unit. The traffic channel has a multiplexing capability to allow user signaling information as well as user messaging (e.g., voice or low-rate data) to be sent in either direction. According to the prior art, signaling information sent from a mobile unit needs to be aggregated at the cell designated as the primary cell for the call. In addition, signaling information to be sent to the mobile unit is generated at the primary cell, but needs to be transmitted simultaneously from all legs to the mobile unit.

Figure 2:
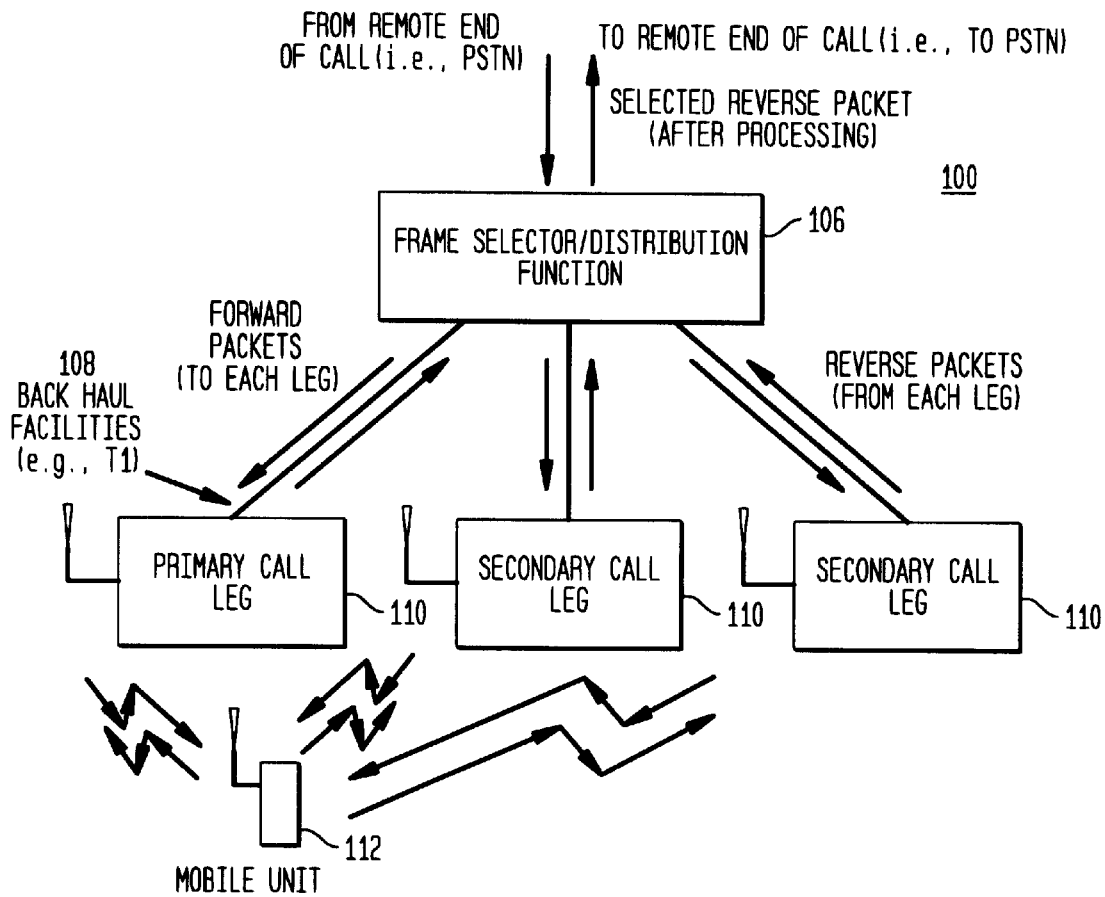
FIG. 2 shows a functional block diagram of a portion of the communications system of FIG. 1 for a mobile unit operating in soft handoff with three base stations.
Figure 3A:
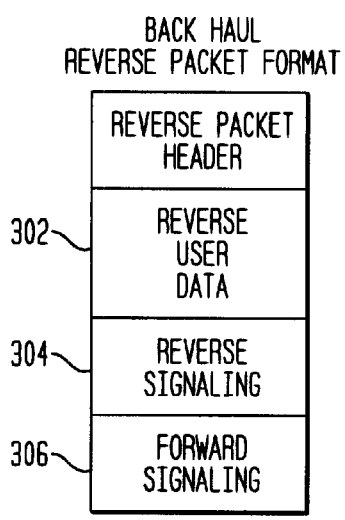
FIGS. 3A–B show packet formats for the forward and reverse back haul packets, respectively, for the CDMA wireless system of FIG. 2.
Figure 3B:
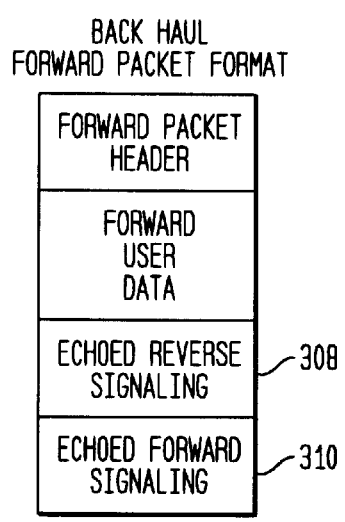

FIGS. 3A–B show packet formats for the forward and reverse back haul packets, respectively, for the conventional CDMA wireless system of FIG. 2. The packet formats of FIGS. 3A–B can be used to support the following method of handling signaling and user data. In the reverse direction, each leg receives a reverse-link transmission from the mobile unit and separates the user data from any signaling information contained in the transmission. These two types of information are placed in separate portions of a back haul packet and routed to the FSD function. The FSD function performs its selection function, as described above, and passes the selected frame's user data (302) to the other end of the call. In addition, the FSD function removes the reverse signaling information (304) from the selected reverse packet and places it in the next forward packet being sent on the back haul to the call legs as echoed reverse signaling (308). The distribution function therefore echoes the reverse signaling to all call legs. The primary call leg can therefore retrieve the user's reverse signaling information from the echoed signaling, even if it fails to receive the user's direct transmission over the air interface.

Similarly, when the primary leg needs to send signaling information to the mobile unit, it places the forward signaling information in a space (306) reserved in the reverse back haul packet format for forward signaling. The FSD function removes this forward signaling information and places it into the next forward packet being sent on the back haul to all call legs. This space is called echoed forward signaling (310). All call legs receive the forward-bound information from their back haul interfaces, and can transmit simultaneously forward-bound user messaging and signaling.

In prior-art CDMA wireless standards, the set of traffic channels on the legs of a CDMA call operate symmetrically in both forward and reverse directions to enable the mobile unit to communicate through the FSD function with the other end of its connection (e.g., with the remote voice user for a voice call). While this arrangement is satisfactory for voice calls and for circuit-mode data calls, it has latency deficiencies when applied to a packet data call. Recent CDMA air interface standards (i.e., IS-95B and IS-95C) specify that, for a high-speed packet data call, one low-speed air interface channel is used for transmitting signaling information and small-size information packets. This channel is referred to as the fundamental channel (FCH), or as the dedicated control channel (DCCH). Another air interface channel, called the supplemental channel (SCH), is used to carry larger size information packets at high rates to the mobile user (i.e., forward direction) or from the mobile user (i.e., reverse direction). In IS-95B, the supplemental channel is an aggregation of several low-speed air interface channels, whereas, in IS-95C, a single high-speed air interface channel is used. The remainder of this section refers only to the FCH and to the SCH, and does not mention the use of a DCCH. Doing so simplifies the discussion, and does not detract from the application of these concepts to a DCCH.

The present invention accepts the recent IS-95 air interface standards without change, and achieves improved delay performance for a high-speed packet data service as compared with approaches using the prior art of circuit-oriented back haul interfaces. In the present invention, the reverse FCH (RFCH) and reverse SCH (R-SCH) may be placed in soft handoff with multiple legs. The forward FCH (F-FCH) is likewise kept in soft handoff on the multiple legs, consistent with recent IS-95 standards specifications. The connections through the back haul facilities to the FSD function for the F-FCH and R-FCH are based on the same circuit-oriented procedures as are used in the prior art for voice calls. However, the F-SCH and the R-SCH are connected through the back haul facilities to a separate FSD function that operates with packet-mode procedures designed for the intermittent signal processing associated with bursts of data messaging.

Figure 4:
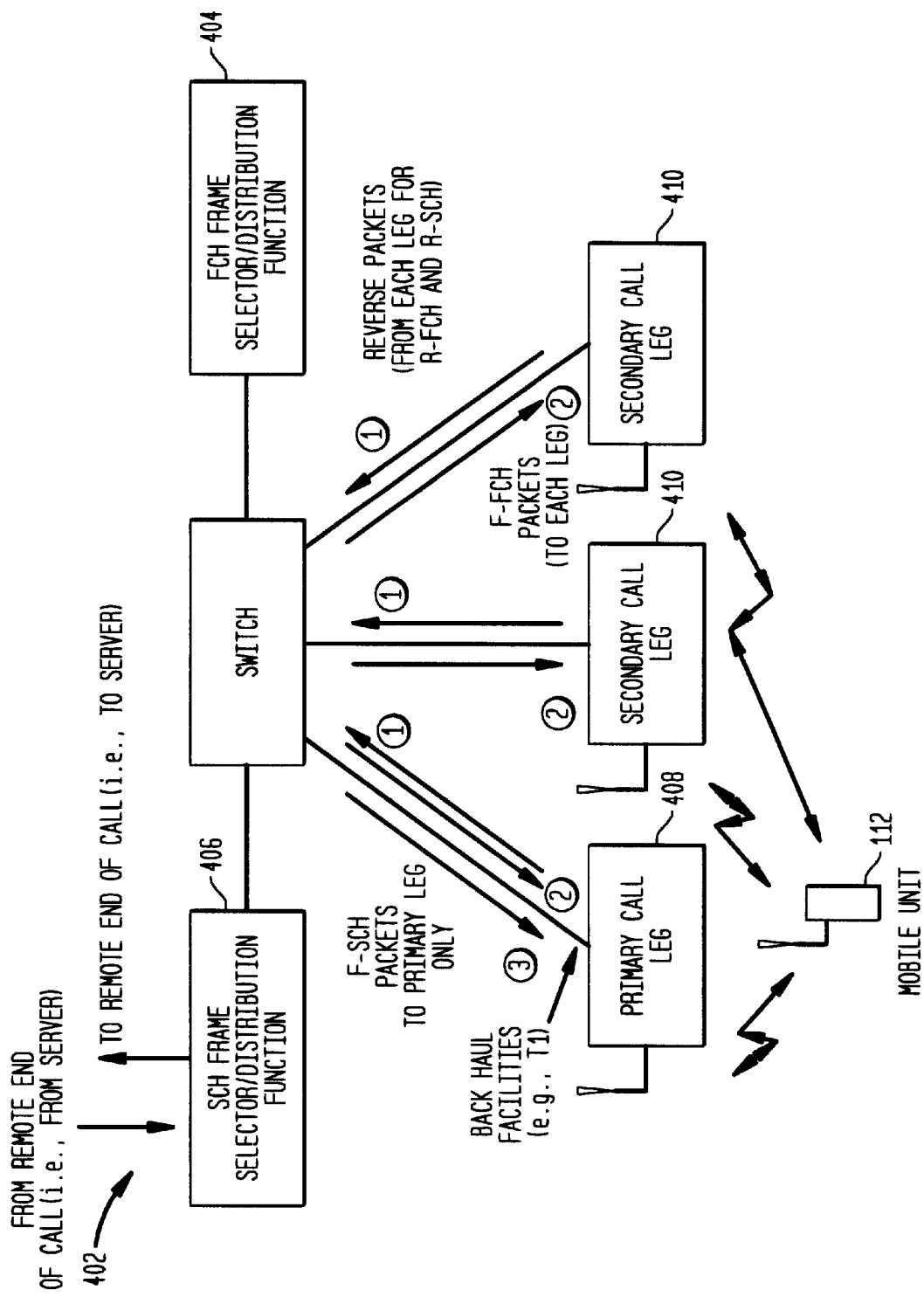
FIG. 4 shows a block diagram of the back haul and base station channel arrangements, according to one embodiment of the present invention, for a packet data call in soft handoff.

FIG. 4 shows a block diagram of the back haul and base station channel arrangements, according to one embodiment of the present invention for a packet data call in soft handoff. Two separate FSD functions are shown: one (404) for the FCH and a second (406) for the SCH. The remote end of the packet data call (e.g., a server computer) has a connection path 402 through FSD function 406 dedicated to the SCH. The SCH distribution function in FSD function 406 sends forward-link data to the leg that currently has the strongest signal at the mobile unit. This leg is called the primary leg 408.

When the primary leg receives forward-link user data from the SCH distribution function, it can allocate a supplemental channel resource, communicate the assigned SCH high-data-rate air-interface channel parameters to mobile unit 412 using the F-FCH, and then send its data to the mobile using the F-SCH. This scenario is followed if there is a large amount of forward user data to send. If there is not a lot of data to send, another strategy is to avoid allocating the scarce F-SCH resource and instead use the already-assigned forward FCH (F-FCH) air interface resource to handle the data messaging. However, user data sent on the F-FCH needs to be transmitted at all legs at the same time, whereas the data is already stored in the primary leg, but not in the secondary legs of the call. The present invention extends the prior art and provides a way to solve this problem.

Figure 5A:
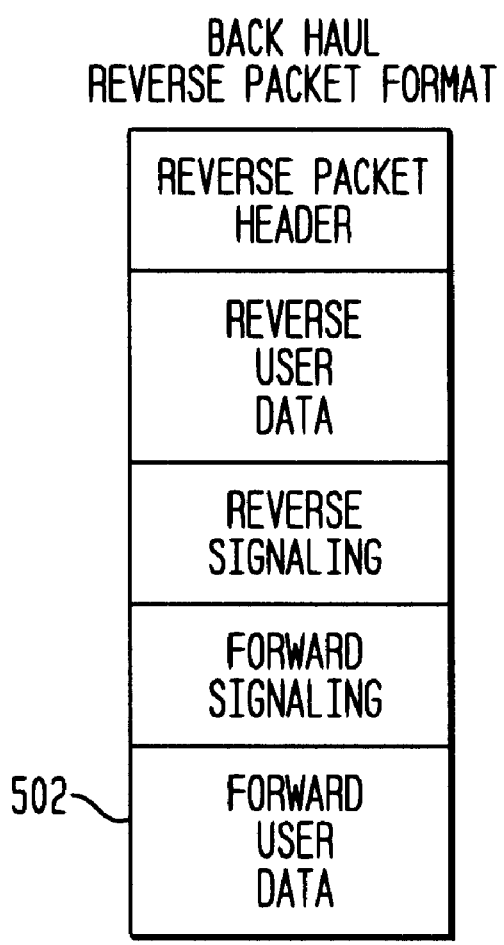
FIGS. 5A–B show packet formats for the forward and reverse back haul packets, respectively, for the CDMA wireless system of FIG. 4.
Figure 5B:
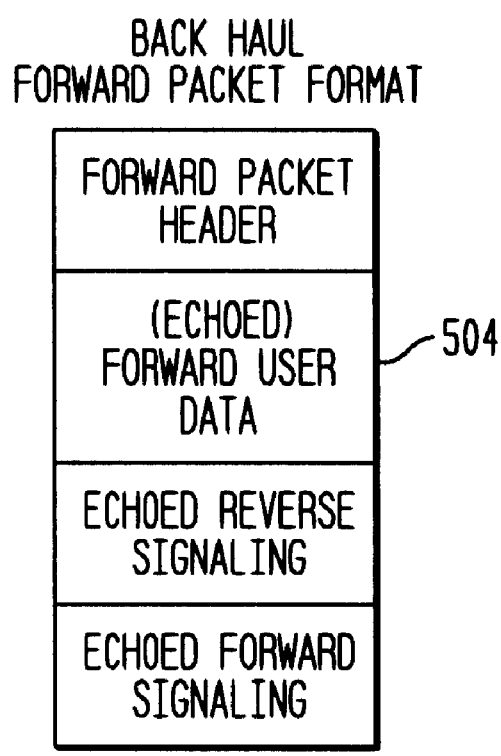

FIGS. 5A–B show packet formats for the forward and reverse back haul packets, respectively, for the CDMA wireless system of FIG. 4. The present invention introduces the concept of echoed forward user data. The conventional back haul reverse packet format of FIG. 3A is redefined to include a space for forward user data (502 in FIG. 5A). When the primary leg has user data that is to be sent to the mobile unit from all call legs, the primary leg places the data in the forward user data portion 502 of the next FCH reverse packet being sent on the back haul. When the FSD function for the FCH (404 in FIG. 4) receives this back haul reverse packet, it extracts the forward user data, and echoes it to all the call legs by inserting the extracted data into the forward data portion (504 in FIG. 5B) of the next back haul forward packet being sent to all the call legs. As in the prior art, the FSD function places information into the forward packet to indicate to the legs the precise time of transmission of this packet to the mobile unit. The FSD function echoes the forward user data back to the primary leg, even though the primary leg already has that data, because there are transmission delays on the back haul and the primary leg needs to know the exact transmission time used at all call legs.

The solution presented here to providing a high-speed packet data service using the air interfaces currently specified by CDMA standards has at least two novel components. One component is the concept of using (a) a circuit-mode connection of multiple call legs to an FSD function for the signaling channel (this channel can also carry small-size user data packets) and (b) a packet-mode FSD function to handle the transmissions involving the high-rate SCH that is assigned to the call only when there are large amounts of data to be exchanged with the mobile unit. The second component addresses the problem of distributing forward user data from the primary call leg to all of the secondary call legs (410 in FIG. 4) when small amounts of data are to be transmitted to the mobile.

Prior-art IS-95 CDMA standards make symmetric the use of dedicated signaling channels. If the signaling channel is placed into soft handoff with multiple legs on the reverse link, then the signaling channel is also placed into soft handoff on the forward link with the same call legs. The reliability of the call is enhanced with the present invention, because it is usual that the signaling channel also carries power control information for the call. For some types of high-speed packet data services, higher system throughput and better reaction to user requests for data transfers are provided when the forward-link user data channels are kept in simplex operation (i.e., only one base station—e.g., the primary leg—communicating with the mobile unit). As such, a situation arises where the F-SCH operates from a single leg in simplex mode, while the forward signaling channel, or F-FCH, operates in soft handoff mode on multiple legs. The use of multiple legs on the forward-link FCH strongly suggests that this channel be connected on the back haul to an FSD function that uses circuit-oriented procedures to coordinate the transmission times of forward frames sent to each leg, just as is done in a voice call.

As in the prior art for voice service, signaling information in the forward direction originates in the primary leg, is carried on the back haul to the FSD function for the FCH, and is echoed to each leg via a forward back haul packet transmission. When implementing a high-speed packet data service, the high-speed F-SCH is not connected from the primary leg to the FSD function that serves the FCH, but is instead connected in a path through a different FSD function to the other end of the data call from the mobile user. Packet-mode procedures are used for this interface, which result in improved delay performance of the high-speed packet data service. In the forward direction, data that needs to be sent to the mobile unit is sent from the other end of the call to the primary leg without the need to first coordinate the scheduled air interface transmissions with either the primary leg or any other call legs. The use of separate circuit-mode and packet-mode back haul interfaces for the call thus leads to improved service qualities, while is in keeping with prior-art air interface standards.

When the amount of information sent from the distribution function of the SCH FSD function to the primary leg is small, it may be more efficient to send the data to the mobile using the already-established F-FCH, rather than setting up F-SCH resources. The concept of echoed forward data on the back haul facility solves the problem of distributing the forward data from the primary call leg to the secondary call legs.

The use of a packet-oriented FSD function provides a benefit for reverse-link data carried in the reverse supplemental channel (R-SCH) from all call legs. Reverse-link packet data frames are passed from the packet-oriented FSD to the radio link protocol (RLP) function, which, according to existing standards such as Interim Standard IS-707, can accept user data that is out of sequence and drop duplicate user data information frames. Because of these properties of the RLP function, the packet-oriented FSD function can pass to the RLP function any good packet received from any call leg. Hence, there is no need to synchronize the R-SCH on any call leg with the packet-oriented FSD function. The time needed to set up an R-SCH with the mobile is therefore less than that required by the exclusively circuit-oriented prior art technology. The call legs agree on the R-SCH to assign, the mobile is informed via an F-FCH signaling message, and transmission begins. No synchronization with the packet-oriented FSD function is required.

Figure 1:
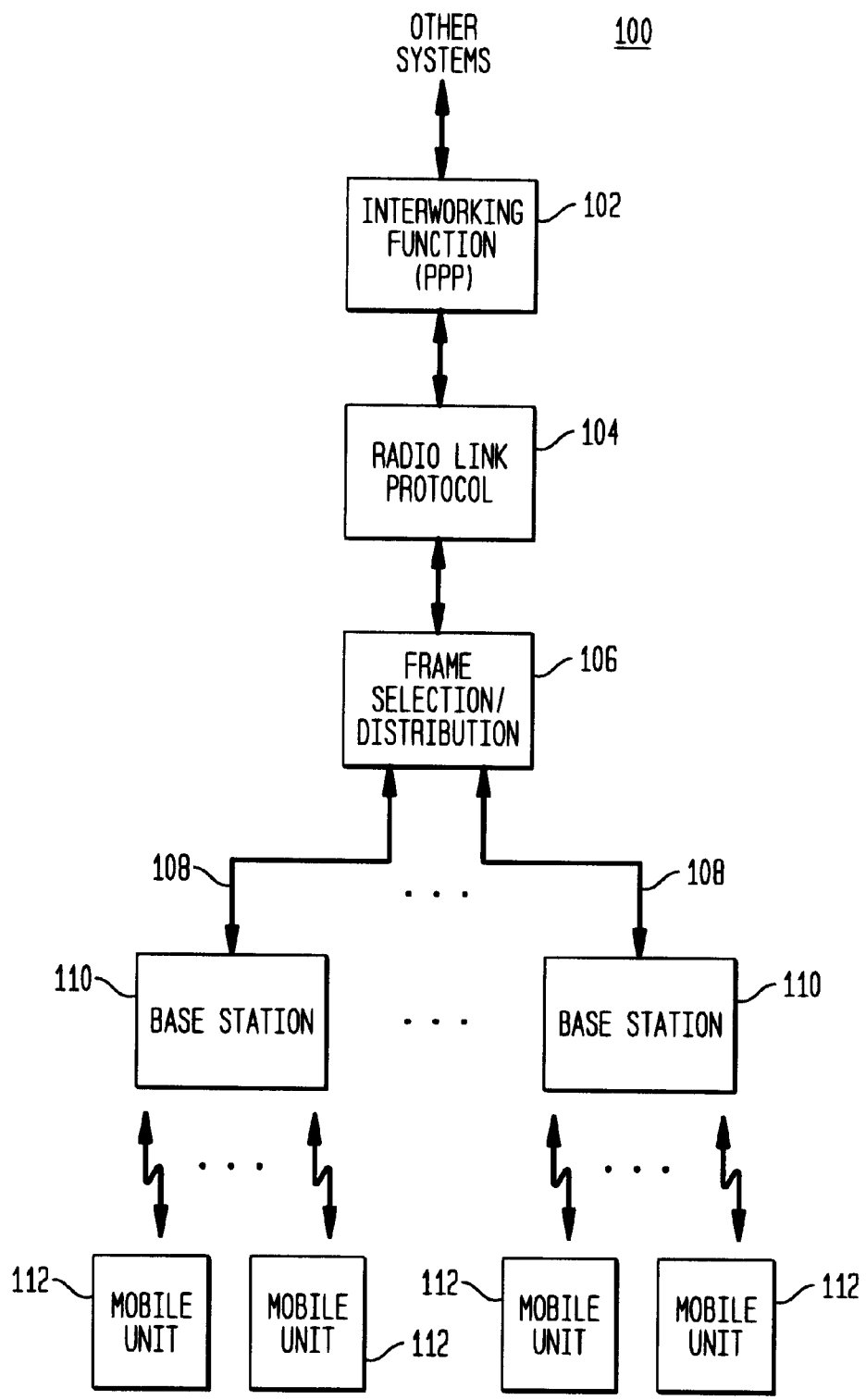
FIG. 1 shows a block diagram of a conventional CDMA wireless communications system.

In FIG. 4, the present invention has been described in the context of a circuit-oriented FSD function and a packet-oriented FSD function that are both implemented as centralized functions (e.g., co-located with the IWF and RLP functions as shown in FIG. 1). In alternative implementations, one or both of these functions may be implemented as distributed functions in which each base station (or a subset of base stations) has an FSD function. In implementations where an FSD function is not centralized, the echoed signaling and echoed forward data may be sent to all call legs, including the primary, or may be sent only to the secondary call legs.

Although not necessarily preferred, embodiments of the present invention may nevertheless have the forward-link frame distribution function implemented separately from the reverse-link frame selection function, including embodiments in which the one of those functions is implemented as a centralized function with the other being implemented as a distributed function.

Although the present invention has been described in the context of IS-95 CDMA wireless systems, it will be understood that the present invention may be able to be implemented in CDMA wireless systems conforming to standards other than the IS-95 family of standards, e.g., the European Telecommunications Standard Institute (ETSI) family of standards. Similarly, the present invention may be able to be implemented in wireless systems other than CDMA systems such as FDMA (frequency division multiple access) or TDMA (time division multiple access) systems.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A wireless communications method, comprising the steps of:
   (a) receiving forward-link data at a frame selection/distribution (FSD) function of a wireless communications system;
   (b) transmitting the forward-link data from the FSD function to a primary base station of the wireless communications system without first coordinating between the FSD function and the primary base station regarding transmission of the forward-link data from the primary base station over an air interface; and
   (c) determining at the primary base station whether to transmit the forward-link data over the air interface using a fundamental channel or a supplemental channel.

2. The invention of claim 1, wherein the wireless communications system is an IS-95 CDMA system.

3. The invention of claim 1, wherein, when the primary base station determines to transmit the forward-link data using the supplemental channel, then the primary base station always uses the supplemental channel in simplex mode to transmit the forward-link data over the air interface.

4. The invention of claim 3, wherein, when the primary base station uses the forward-link supplemental channel in the simplex mode, the primary base station can operate in soft handoff with one or more secondary base stations of the wireless communications system to transmit forward-link signaling using either the fundamental channel or a dedicated control channel.

5. The invention of claim 1, wherein, when the primary base station determines to transmit the forward-link data using the fundamental channel and if the primary base station is currently operating in soft handoff with one or more secondary base stations of the wireless communications system, then:
   (1) the primary base station transmits the forward-link data to the FSD function;
   (2) the FSD function transmits the forward-link data to the primary base station and the one or more secondary base stations; and
   (3) the primary base station and the one or more secondary base stations simultaneously transmit the forward-link data over the air interface using fundamental channels.

6. The invention of claim 5, wherein:
   a format of a reverse-link packet transmitted from the primary base station to the FSD function includes a field for the forward-link data; and
   a format of a forward-link packet transmitted from the FSD function to the primary base station and each secondary base station includes a field for echoing the forward-link data.

7. The invention of claim 1, wherein the FSD function comprises (1) a circuit-oriented FSD function configured to handle the selection and distribution functions for the fundamental channel or a dedicated control channel and (2) a packet-oriented FSD function configured to handle the selection and distribution functions for the supplemental channel.

8. The invention of claim 7, wherein the packet-oriented FSD function passes reverse-link data to a radio link protocol (RLP) function without having first to be synchronized with any mobile units.

9. The invention of claim 1, wherein:
   the wireless communications system is an IS-95 CDMA system;
   when the primary base station determines to transmit the forward-link data using the supplemental channel, then the primary base station always uses the supplemental channel in simplex mode to transmit the forward-link data over the air interface;

when the primary base station uses the forward-link supplemental channel in the simplex mode, the primary base station can operate in soft handoff with one or more secondary base stations of the wireless communications system to transmit forward-link signaling using either the fundamental channel or a dedicated control channel;

when the primary base station determines to transmit the forward-link data using the fundamental channel and if the primary base station is currently operating in soft handoff with one or more secondary base stations of the wireless communications system, then:

(1) the primary base station transmits the forward-link data to the FSD function using a reverse-link packet that includes a field for the forward-link data;

(2) the FSD function transmits the forward-link data to the primary base station and the one or more secondary base stations using a forward-link packet that includes a field for echoing the forward-link data; and (3) the primary base station and the one or more secondary base stations simultaneously transmit the forward-link data over the air interface using fundamental channels;

the FSD function comprises (1) a circuit-oriented FSD function configured to handle the selection and distribution functions for the fundamental channel or a dedicated control channel and (2) a packet-oriented FSD function configured to handle the selection and distribution functions for the supplemental channel; and the packet-oriented FSD function passes reverse-link data to an RLP function without having first to be synchronized with any mobile units.

10. A wireless communications system, comprising an FSD function configured to:

(a) receive forward-link data; and (b) transmit the forward-link data to a primary base station of the wireless communications system without first coordinating between the FSD function and the primary base station regarding transmission of the forward-link data from the primary base station over an air interface.

11. The invention of claim 10, wherein the wireless communications system is an IS-95 CDMA system.

12. The invention of claim 10, wherein the FSD function comprises (1) a circuit-oriented FSD function configured to handle the selection and distribution functions for a fundamental channel or a dedicated control channel and (2) a packet-oriented FSD function configured to handle the selection and distribution functions for a supplemental channel.

13. The invention of claim 12, wherein the packet-oriented FSD function passes reverse-link data to an RLP function without having first to be synchronized with any mobile units.

14. The invention of claim 10, wherein the primary base station is configured to determine whether to transmit the forward-link data over the air interface using a fundamental channel or a supplemental channel.

15. The invention of claim 14, wherein, when the primary base station determines to transmit the forward-link data using the supplemental channel, then the primary base station always uses the supplemental channel in simplex mode to transmit the forward-link data over the air interface.

16. The invention of claim 15, wherein, when the primary base station uses the forward-link supplemental channel in the simplex mode, the primary base station can operate in soft handoff with one or more secondary base stations of the wireless communications system to transmit forward-link signaling using either the fundamental channel or a dedicated control channel.

17. The invention of claim 14, wherein, when the primary base station determines to transmit the forward-link data using the fundamental channel and if the primary base station is currently operating in soft handoff with one or more secondary base stations of the wireless communications system, then:

(1) the primary base station transmits the forward-link data to the FSD function;

(2) the FSD function transmits the forward-link data to the primary base station and the one or more secondary base stations; and (3) the primary base station and the one or more secondary base stations simultaneously transmit the forward-link data over the air interface using fundamental channels.

18. The invention of claim 17, wherein:

a format of a reverse-link packet transmitted from the primary base station to the FSD function includes a field for the forward-link data; and a format of a forward-link packet transmitted from the FSD function to the primary base station and each secondary base station includes a field for echoing the forward-link data.

19. The invention of claim 10, wherein:

the wireless communications system is an IS-95 CDMA system;

the FSD function comprises (1) a circuit-oriented FSD function configured to handle the selection and distribution functions for a fundamental channel or a dedicated control channel and (1) a packet-oriented FSD function configured to handle the selection and distribution functions for a supplemental channel;

the packet-oriented FSD function passes reverse-link data to an RLP function without having first to be synchronized with any mobile units;

the primary base station is configured to determine whether to transmit the forward-link data over the air interface using the fundamental channel or the supplemental channel;

when the primary base station determines to transmit the forward-link data using the supplemental channel, then the primary base station always uses the supplemental channel in simplex mode to transmit the forward-link data over the air interface;

when the primary base station uses the forward-link supplemental channel in the simplex mode, the primary base station can operate in soft handoff with one or more secondary base stations of the wireless communications system to transmit forward-link signaling using either the fundamental channel or a dedicated control channel; and when the primary base station determines to transmit the forward-link data using the fundamental channel and if the primary base station is currently operating in soft handoff with one or more secondary base stations of the wireless communications system, then:

(1) the primary base station transmits the forward-link data to the FSD function using a reverse-link packet that includes a field for the forward-link data;

(2) the FSD function transmits the forward-link data to the primary base station and the one or more secondary base stations using a forward-link packet that includes a field for echoing the forward-link data; and (3) the primary base station and the one or more secondary base stations simultaneously transmit the forward-link data over the air interface using fundamental channels.

20. A primary base station for a wireless communications system, wherein the primary base station is configured to:
  (a) receive forward-link data; and
  (b) determine whether to transmit the forward-link data over an air interface using a fundamental channel or a supplemental channel without first coordinating between an FSD function of the wireless communications network and the primary base station regarding transmission of the forward-link data from the primary base station over the air interface.

21. The invention of claim 20, wherein the wireless communications system is an IS-95 CDMA system.

22. The invention of claim 20, wherein, when the primary base station determines to transmit the forward-link data using the supplemental channel, then the primary base station always uses the supplemental channel in simplex mode to transmit the forward-link data over the air interface.

23. The invention of claim 22, wherein, when the primary base station uses the forward-link supplemental channel in the simplex mode, the primary base station can operate in soft handoff with one or more secondary base stations of the wireless communications system to transmit forward-link signaling using either the fundamental channel or a dedicated control channel.

24. The invention of claim 20, wherein, when the primary base station determines to transmit the forward-link data using the fundamental channel and if the primary base station is currently operating in soft handoff with one or more secondary base stations of the wireless communications system, then:
  (1) the primary base station transmits the forward-link data to the FSD function;
  (2) the FSD function transmits the forward-link data to the primary base station and the one or more secondary base stations; and
  (3) the primary base station and the one or more secondary base stations simultaneously transmit the forward-link data over the air interface using fundamental channels.

25. The invention of claim 24, wherein:
  a format of a reverse-link packet transmitted from the primary base station to the FSD function includes a field for the forward-link data; and
  a format of a forward-link packet transmitted from the FSD function to the primary base station and each secondary base station includes a field for echoing the forward-link data.

26. The invention of claim 20, wherein:
  the wireless communications system is an IS-95 CDMA system;
  when the primary base station determines to transmit the forward-link data using the supplemental channel, then the primary base station always uses the supplemental channel in simplex mode to transmit the forward-link data over the air interface;
  when the primary base station uses the forward-link supplemental channel in the simplex mode, the primary base station can operate in soft handoff with one or more secondary base stations of the wireless communications system to transmit forward-link signaling using either the fundamental channel or a dedicated control channel; and
  when the primary base station determines to transmit the forward-link data using the fundamental channel and if the primary base station is currently operating in soft handoff with one or more secondary base stations of the wireless communications system, then:
    (1) the primary base station transmits the forward-link data to the FSD function using a reverse-link packet that includes a field for the forward-link data;
    (2) the FSD function transmits the forward-link data to the primary base station and the one or more secondary base stations using a forward-link packet that includes a field for echoing the forward-link data; and
    (3) the primary base station and the one or more secondary base stations simultaneously transmit the forward-link data over the air interface using fundamental channels.

27. A primary base station for a wireless communications system, wherein the primary base station is configured to:
  (a) receive forward-link data; and
  (b) determine whether to transmit the forward-link data over an air interface using a fundamental channel or a supplemental channel, wherein, when the primary base station determines to transmit the forward-link data using the supplemental channel, then the primary base station always uses the supplemental channel in simplex mode to transmit the forward-link data over the air interface.

28. The invention of claim 27, wherein, when the primary base station uses the forward-link supplemental channel in the simplex mode, the primary base station can operate in soft handoff with one or more secondary base stations of the wireless communications system to transmit forward-link signaling using either the fundamental channel or a dedicated control channel.

29. A primary base station for a wireless communications system, wherein the primary base station is configured to:
  (a) receive forward-link data; and
  (b) determine whether to transmit the forward-link data over an air interface using a fundamental channel or a supplemental channel, wherein, when the primary base station determines to transmit the forward-link data using the fundamental channel and if the primary base station is currently operating in soft handoff with one or more secondary base stations of the wireless communications system, then:
    (1) the primary base station transmits the forward-link data to the FSD function;
    (2) the FSD function transmits the forward-link data to the primary base station and the one or more secondary base stations; and
    (3) the primary base station and the one or more secondary base stations simultaneously transmit the forward-link data over the air interface using fundamental channels.

30. The invention of claim 29, wherein:
  a format of a reverse-link packet transmitted from the primary base station to the FSD function includes a field for the forward-link data; and
  a format of a forward-link packet transmitted from the FSD function to the primary base station and each secondary base station includes a field for echoing the forward-link data.

* * * * *